Feb. 15, 1927.
E. L. BARNES
1,617,743
MEANS FOR PILING COTTON BALES
Filed Jan. 13, 1926    3 Sheets-Sheet 1
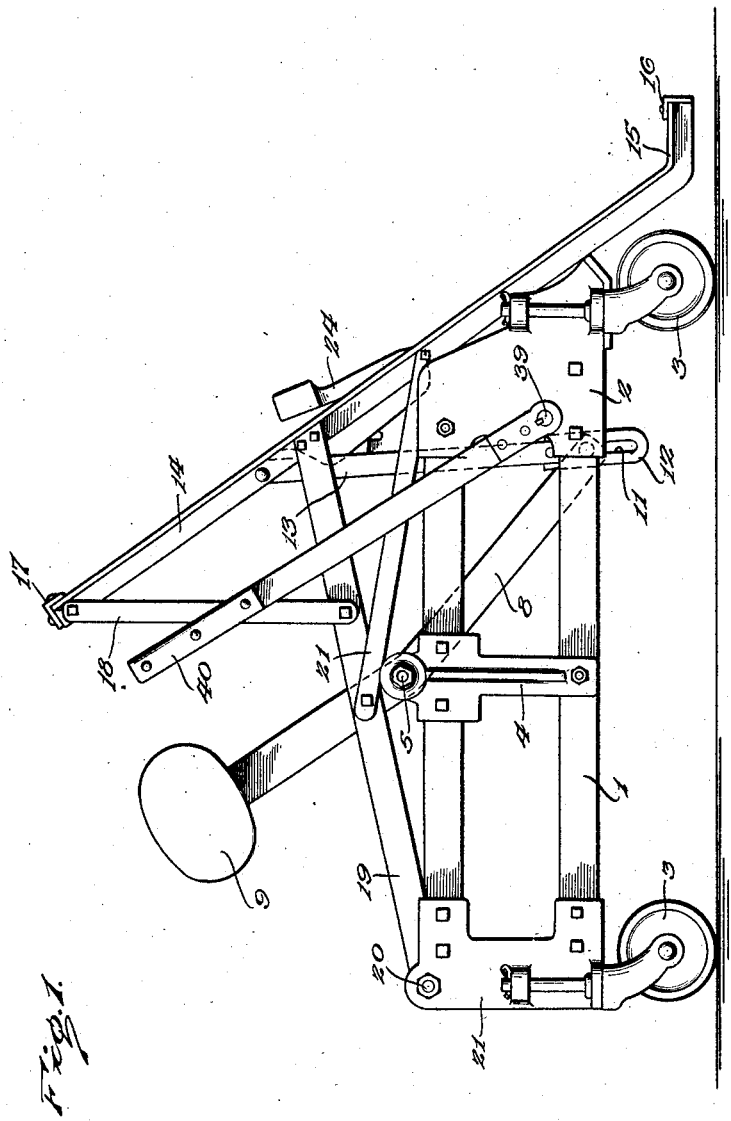
Inventor
E. L. Barnes
By Lacey & Lacey, Attorneys Feb. 15, 1927.
E. L. BARNES
1,617,743
MEANS FOR PILING COTTON BALES
Filed Jan. 13, 1926
3 Sheets-Sheet 2
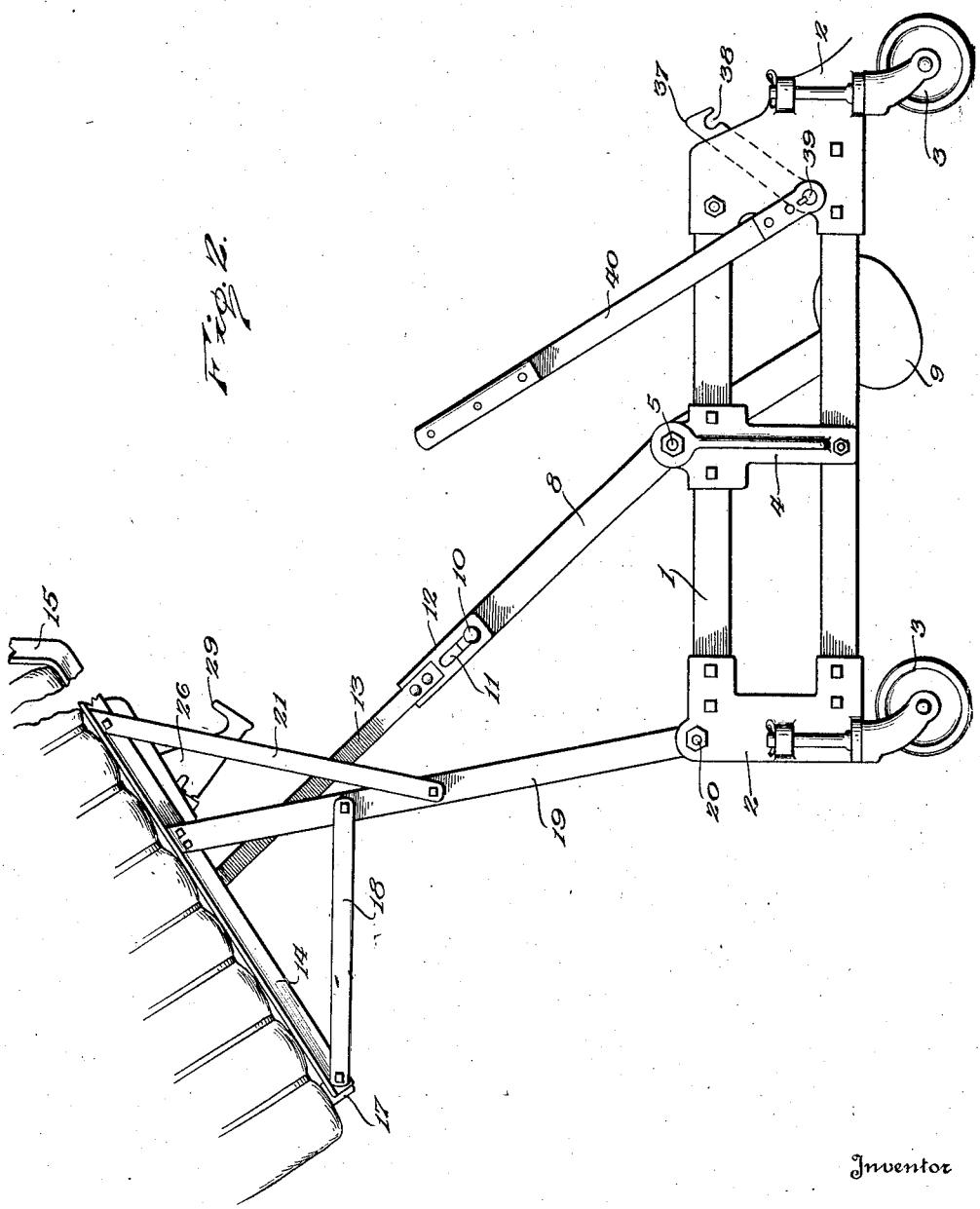
Inventor
E. L. Barnes
By Lacy & Lacy, Attorney

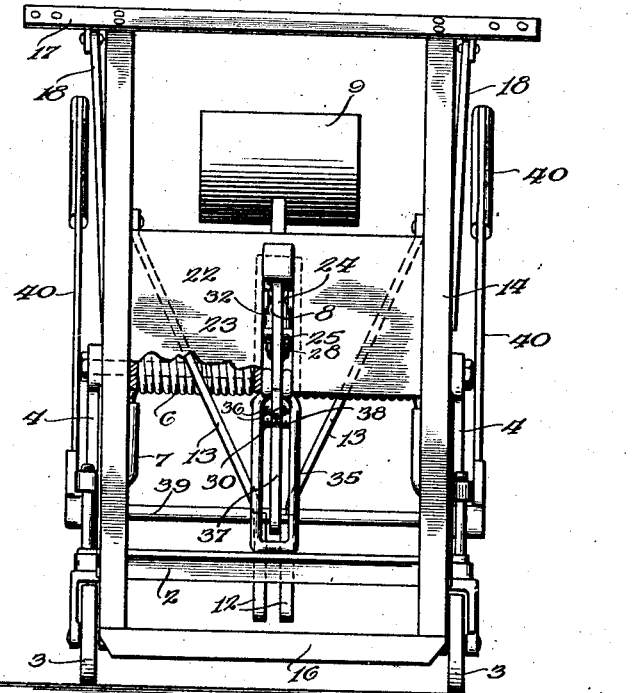

Patented Feb. 15, 1927.

1,617,743

UNITED STATES PATENT OFFICE.

ELVIS L. BARNES, OF OKLAHOMA CITY, OKLAHOMA.

MEANS FOR PILING COTTON BALES.

Application filed January 13, 1926. Serial No. 81,066.

This invention relates to apparatus for piling cotton bales, the primary object of the invention being to provide a machine of simple construction which will operate semi-automatically to stand a second row of bales upright upon a previously arranged row of bales. The invention also has for its object the provision of means which will hold the machine in position to permit a bale to be placed upon the carrier and will be released by the delivery of the bale to permit actuating elements to impart movement to the carrier whereby the bale will be raised and brought to a position where it may be easily stood on end, and a further object of the invention is to provide means whereby the return of the bale carrier to bale-receiving position will be facilitated. Other objects of the invention will appear incidentally in the course of the following description, and the invention resides in certain novel features which will be particuarly pointed out in the appended claims.

In the drawings:

Figure 1 is a side elevation of my improved machine showing the same arranged to receive a bale;

Fig. 2 is a similar view showing the position of the carrier when a bale is about to be discharged;

Fig. 3 is a front elevation with parts broken away and in section, and

Fig. 4 is a vertical central longitudinal section through the front end of the machine.

In carrying out my present invention, I provide a pair of side frames 1 which are connected at their ends by end castings 2, and upon the outer sides of each end casting are mounted casters 3 whereby the machine may be easily moved from place to place. To the side frames, approximately at the centers thereof, I secure brackets 4 which serve to reinforce the frames and also provide supports for a pivot rod 5 which extends across the machine and serves as a support or sustaining member for the coiled springs 6 which constitute the main actuating element of the machine, the ends of the said springs being engaged in sockets 7 formed on the inner sides of the said brackets 4. Mounted upon the pivot rod 5 for oscillation thereon is the main lever 8 which is provided with a weight 9 at one end and at its opposite end carries a pin 10 engageable in the slots 11 of brackets 12 which are secured to the free ends of arms 13 secured pivotally to the carrier 14. The bale carrier 14 consists essentially of side bars having off-sets 15 at one end connected by a cross bar or bridge member 16, as shown, the said off-sets and the said bridge member constituting a stop whereby an end of a bale of cotton may be held against dropping after it has been brought into position upon the carrier. The ends of the carrier side bars remote from the off-sets are connected by a cross bar 17 and to the extremities of said cross bar and the adjacent ends of the side bars I secure braces 18 which extend to the rocking arms 19 which are disposed at the sides of the carrier and are each rigidly secured thereto at one end while the opposite end thereof is mounted upon a cross rod 20 for pivotal movement thereon. The said cross rod 20 is secured rigidy in the side frames 1 at the upper rear corners thereof and the arms 19 rock about said rod in vertical planes in the operation of the machine. In addition to the braces 18, other braces 21 are provided and these braces 21 extend between the arms 19 and the carrier so that a rigid strong structure will be provided to support the bale. The arms 13 are pivoted to the sides of the carrier and converge inwardly and downwardly therefrom so as to be disposed at opposite sides of the main lever or lifting arm 8, as will be understood. The springs 6 are engaged at their inner ends with the lever 8 immediately adjacent the pivot rod 5 and are so arranged that they will be under tension when the carrier is in its lower position, shown in Figs. 1, 3 and 4, so that, if the carrier be free to move, the force of the springs cooperating with the weight 9 will rock the lever 8 so that the pin 10 at the end thereof will tend to move upwardly and by its engagement with the upper ends of the slots 11 will lift the arms 13, causing the carrier to swing upwardly and over the frame about the pivot rod 20 as a center. About midway the ends of the carrier, a plate or platfrom 22 is secured to the side bars thereof and said plate is provided at its center with a slot 23 extending parallel with the side bars of the carrier. Pivoted at the lower end of the said slot is a trip arm 24, the upper end of which normally projects beyond the plane of the carrier, as clearly shown in Figs. 1 and 4. Disposed at the rear of the said trip and pivotally supported, as at 25, upon the carrier is a latch 26 having a forwardly projecting lug 27 immediately below its pivot adapted to engage the inner or rear side of the trip 24, as shown in Fig. 4, said lug being preferably equipped with a roller 28 whereby frictional wear upon the parts will be minimized. The latch is also provided at its lower end with a forwardly projecting lip 29 which is adapted to engage under a transverse rod or bolt 30 secured in and extending between the upper front corners of the side frames 1, the latch serving to hold the carrier in its lowered position when the said lip engages under the said rod, as shown in Fig. 4. The lower edge of the lip 29 is slightly beveled, as clearly shown so that, when the carrier is being lowered, the edge of the latch will ride over the bolt 30 and thereby clear the same, and in order that it may then swing into engagement with the bolt and will be normally held in such engagement, I provide a spring 31 which is fitted in a housing 32 secured upon the carrier adjacent the pivot rod 25, the lower end of the spring bearing upon a lug 33 formed on the rear edge of the latch at the upper end thereof. This arrangement is clearly shown in Fig. 4. It will now be understood that, when a bale is brought into position upon the carrier, the weight of the bale will bear upon the free end of the trip 24 and swing the same into a position substantially flush with the face of the carrier and this movement of the trip will cause the latch to swing about its pivot 25 so that the lip 29 will be released from the bolt 30, whereupon the spring 6 will be free to act and will at once impart the upward rocking movement to the carrier by which the bale is transferred.

The trip 24 is held in place for pivotal movement by a pivot rod 34 extending between the sides of the carrier and upon this rod is suspended a keeper 35 in the form of an elongated bail or loop. Upon the side of the trip 24 adjacent its pivot is a lug 36 which bears against the said bail or keeper so that while the latter may assume a vertical position when the carrier is lowered, as shown in Fig. 4, the movement of the trip under the weight of a bale imposed thereon will swing the loop forwardly in order that it may clear the lower pull-down latch 37 as the carrier swings upwardly. The pull-down latch 37 is a flat bar formed with a hook 38 at one end and secured at its opposite end upon a rock shaft 39 which is rotatably mounted in the front end castings 2 of the supporting frame, and to the ends of the said rock shaft I secure hand levers 40, the latch being thus operable from either side of the machine.

In use, the several parts are normally in the position shown in Figs. 1, 3 and 4 of the drawings, in which position the machine may be easily rolled to a point close to the bales which are to be transferred and the step or platform consisting of the members 15 and 16 may be readily engaged under the end of a bale, upon a platform, which is to be piled upon a previously arranged row of bales. The bale is manually tilted so that it will be supported by the carrier 14 and when it is thus placed in position it will impinge against the trip 24 so that the trip will rock about its pivot 34 and release the latch 26 from the keeper rod 30. As previously stated, the main lever 8 will then swing about its pivot rod 5 so as to raise the carrier to the position shown in Fig. 2, whereupon the bale may be discharged onto a lower bale and set end up by a slight push exerted upon the carrier or the upper end of the bale. When the carrier reaches the position shown in Fig. 2, the springs 6 will be practically relieved of compression and will not exert power upon the carrier. The carrier is then returned manually towards its former position and the compression of the springs 6 will be gradually restored but it will not be strong enough to retard the return movement of the carrier until the carrier has reached such a point that the end of the bail or keeper 35 will engage the hook 38 of the pull-down latch 37. The operator then grasps one of the levers 40, or, if desired, both levers 40 may be brought into play, and rocks the same forwardly and downwardly so that a pull will be exerted upon the carrier through the pull-down latch 37 and the bail 35 to bring the carrier into its lowered position against the increasing tension of the springs 6. As the carrier approaches its lowest position, the latch 26 will ride against and around the keeper rod 30 and will eventually be pressed into engagement therewith through the action of the spring 31. The levers 40 may then be returned to their normal positions, releasing the pull-down latch 37 from the keeper 35, and upon the next operation of the carrier the lug 36 upon the trip 24 will swing the keeper 35 clear of the pull-down latch so that the transferring movement of the carrier will be uninterrupted.

From the foregoing description, taken in connection with the accompanying drawings, it will be seen that I have provided an exceedingly simple and compact machine which will operate in a highly efficient manner to transfer bales of cotton or other commodities from a loading platform onto a previously arranged row of bales so that the labor of arranging bales or like bulky articles within a freight car for shipment or within a warehouse to advantageously utilize storage space will be very materially reduced and the work expedited.

Having thus described the invention, I claim:

1. An apparatus for the purpose set forth comprising a supporting frame, a carrier mounted upon the frame for rocking movement in a vertical plane, an actuating lever mounted upon the frame, an arm pivoted at one end to the carrier and having its opposite end pivotally and slidably connected to the lever, and an actuating spring associated with the frame and the said lever and arranged to be placed under tension by a downward movement of the carrier and to apply lifting force through the lever and said arm to the carrier when released.

2. An apparatus for the purpose set forth comprising a supporting frame, a carrier mounted thereon for rocking movement in a vertical plane, an actuating lever mounted on the frame and operatively connected with the carrier, a torsion spring secured to the frame and engaged with the actuating lever to be placed under tension by downward movement of the carrier, means for restraining the carrier against upward movement, and load-actuated means on the carrier for releasing said restraining means.

3. An apparatus for the purpose set forth comprising a supporting frame, a carrier mounted thereon for rocking movement in a vertical plane, a main actuating lever operatively connected with the carrier, a motor spring secured on the frame and associated with the lever to be placed under tension by downward movement of the carrier, a latch pivotally mounted on the carrier, a keeper on the frame to be engaged by said latch whereby to normally hold the carrier in lowered position, and a trip mounted on the carrier and bearing against said latch whereby to release the latch when load is imposed on the carrier.

4. An apparatus for the purpose set forth comprising a supporting frame, a carrier mounted on the frame for rocking movement in a vertical plane, a main actuating lever mounted upon the supporting frame and operatively engaged with the carrier, a motor spring secured on the frame and engaged with the lever to be placed under tension by downward movement of the carrier, a keeper on the frame, a latch pivoted on the carrier and adapted to engage said keeper, the latch having a projection on its front side below its pivot, yieldable means acting upon the rear side of the latch at the upper end thereof to hold the lower end of the latch in engagement with the keeper, and a trip mounted on the carrier and bearing against the said projection on the latch whereby to release the latch from the keeper when load is imposed on the carrier.

5. An apparatus for the purpose set forth comprising a supporting frame, a carrier mounted thereon for rocking movement in a vertical plane, means connected with the frame and the carrier tending constantly to raise the carrier, means for normally holding the carrier in lowered position, means to release said holding means when load is imposed on the carrier, a keeper suspended on the carrier, and means to engage said keeper and operable to exert a downward pull upon the keeper and the carrier whereby to return the carrier to initial position after discharging a load.

6. An apparatus for the purpose set forth comprising a supporting frame, a carrier pivotally mounted on the frame for rocking movement in a vertical plane, means connected with the frame and the carrier tending constantly to raise the carrier, means for normally holding the carrier in its lowered position, a trip on the carrier for releasing said holding means when load is imposed on the carrier, a bail suspended on the carrier, a rocking arm on the frame arranged to engage said bail to exert pull thereon and return the carrier to lowered position, and means on the trip for swinging the bail clear of said rocking means upon upward movement of the carrier.

7. An apparatus for the purpose set forth comprising a supporting frame, a carrier pivotally mounted on the frame for rocking movement in a vertical plane, means connected with the frame and the carrier tending constantly to raise the carrier, means for normally holding the carrier in its lowered position, a trip pivoted on the carrier for releasing said holding means when load is imposed on the carrier, a bail suspended on the carrier at the pivot of the trip, a rocking arm on the frame arranged to engage said bail to exert pull thereon and return the carrier to lowered position, and a lateral lug on the trip bearing against the inner side of the bail below the upper end thereof for swinging the bail clear of said rocking means upon upward movement of the carrier.

8. An apparatus for the purpose set forth comprising a supporting frame, a carrier, rocking arms pivoted at one end to the frame and rigidly secured at the opposite end to the carrier, a lever fulcrumed on the frame, a link connection between the lever and the carrier, a motor spring connected with the frame and the lever to be put under tension when the carrier is lowered, a latch pivoted on the carrier and engageable with the frame to hold the carrier lowered, and a load-actuated trip on the carrier bearing against the latch below the pivot thereof.

In testimony whereof I affix my signature.

ELVIS L. BARNES. [L. S.]